J. KRONE, G. A. SCHOELLER & H. SUNDHAUSSEN.
ELECTRICALLY DRIVEN ELEVATING MECHANISM FOR GUNS.
APPLICATION FILED MAY 12, 1908.
932,031.
Patented Aug. 24, 1909.
3 SHEETS—SHEET 3.
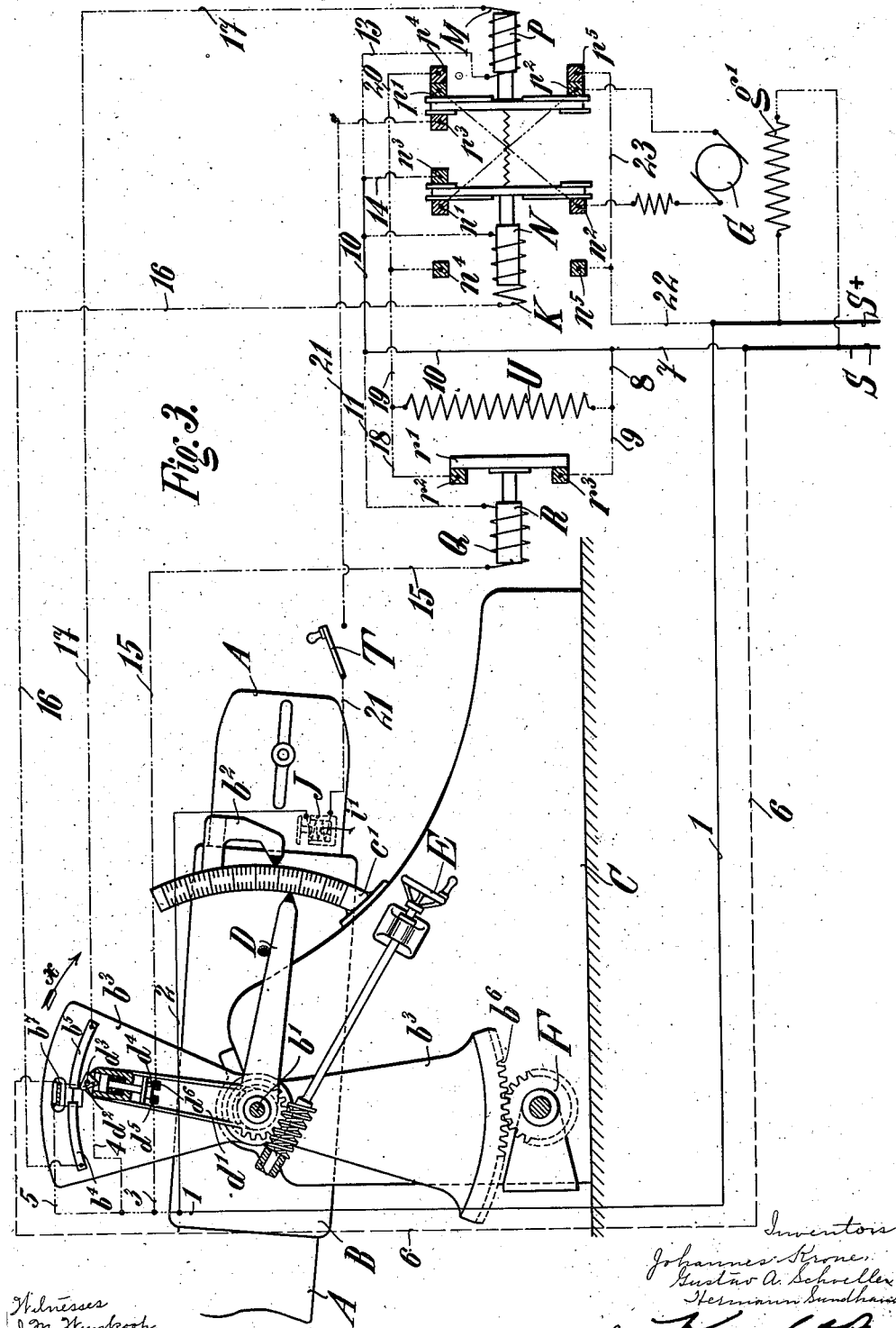

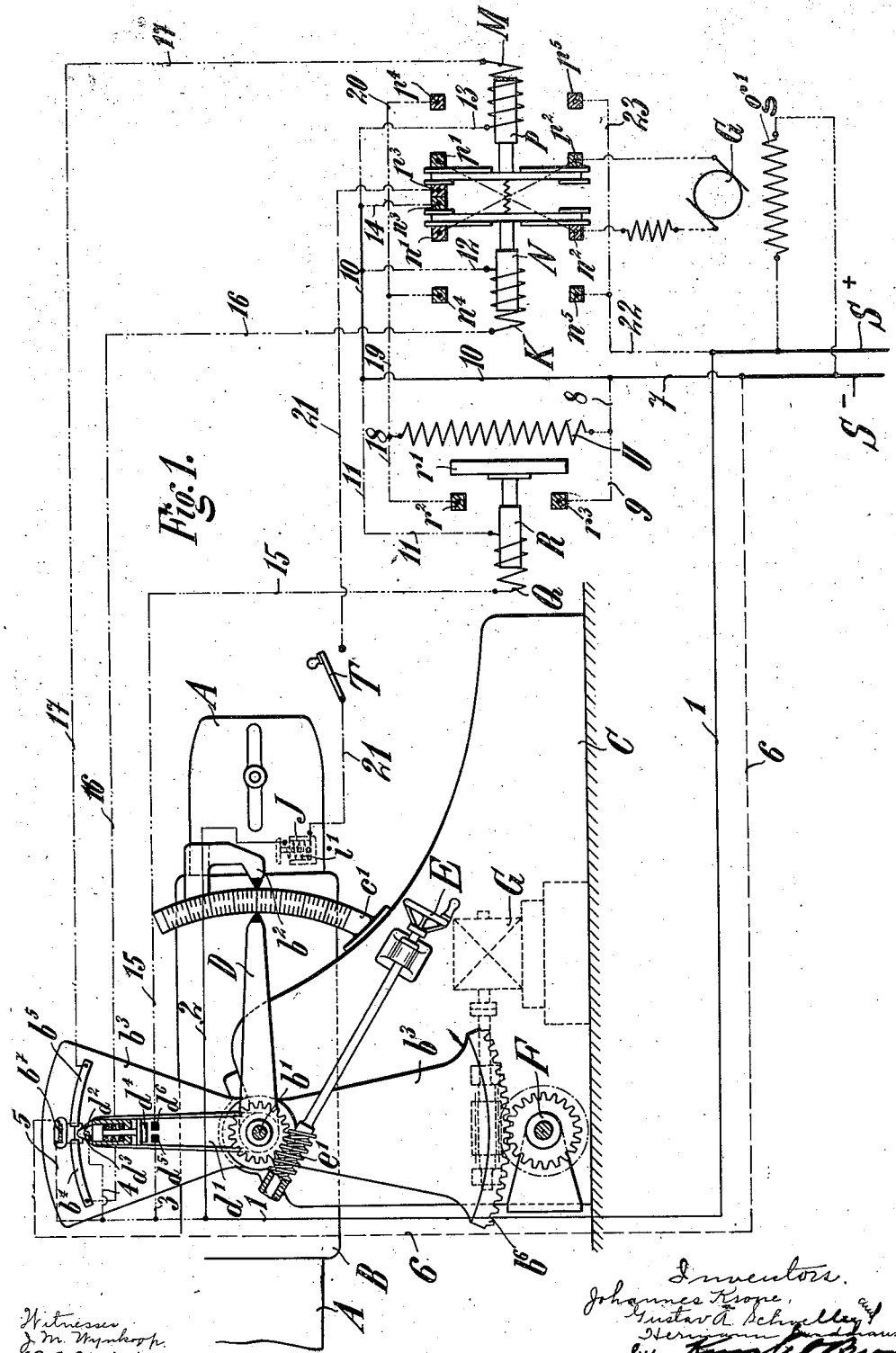

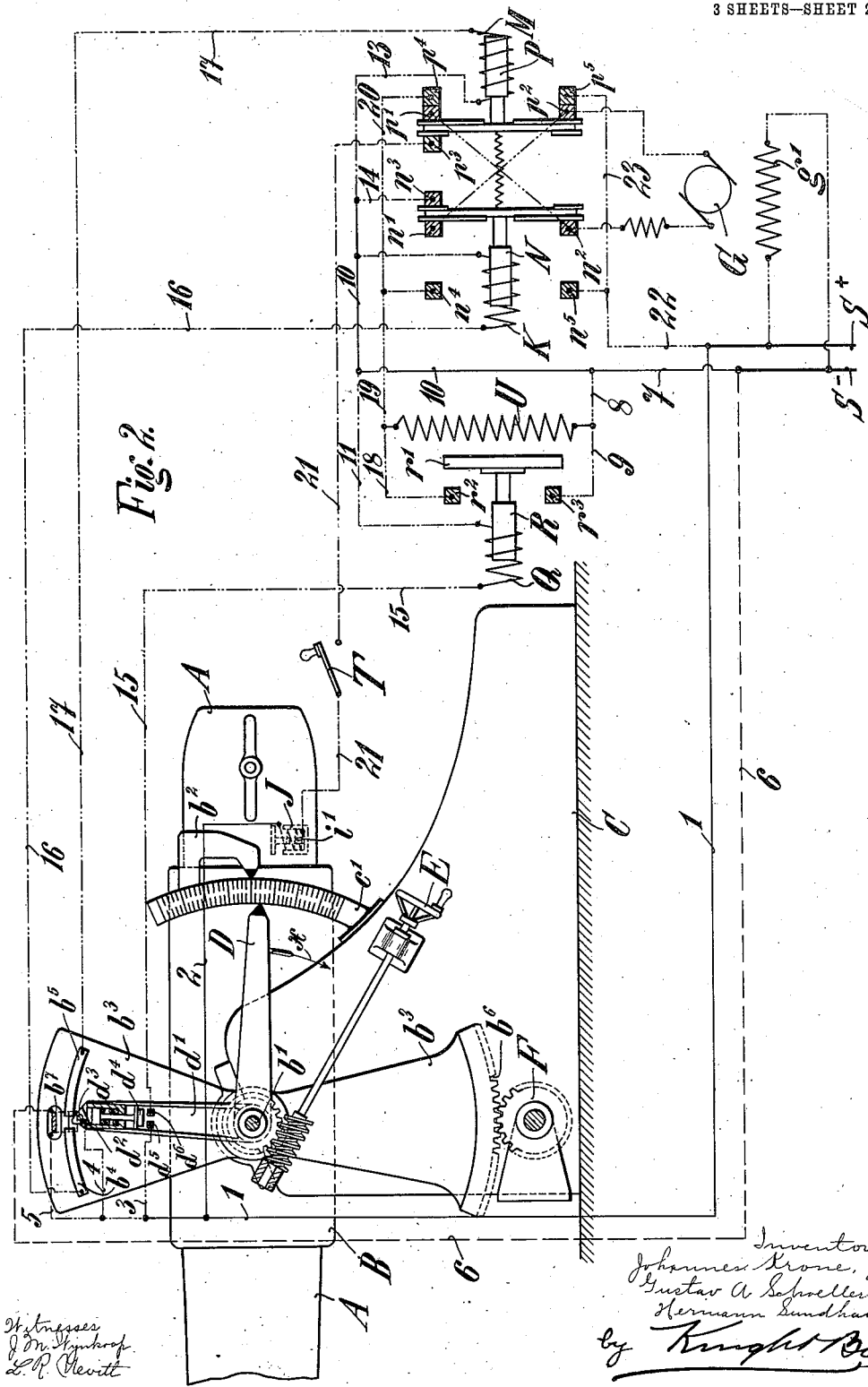

UNITED STATES PATENT OFFICE.

JOHANNES KRONE, OF ESSEN-ON-THE-RUHR, GUSTAV A. SCHOELLER, OF MÜLHEIM-ON-THE-RUHR, AND HERMANN SUNDHAUSSEN, OF BREDENEY, GERMANY, ASSIGNORS TO FRIED. KRUPP AKTIENGESELLSCHAFT, OF ESSEN-ON-THE-RUHR, GERMANY.

ELECTRICALLY-DRIVEN ELEVATING MECHANISM FOR GUNS.

932,031.

Specification of Letters Patent. Patented Aug. 24, 1909.

Application filed May 12, 1908. Serial No. 432,473.

*To all whom it may concern:*

Be it known that we, JOHANNES KRONE, residing at Essen-on-the-Ruhr, Germany, GUSTAV A. SCHOELLER, residing at Mülheim-on-the-Ruhr, Germany, and HERMANN SUNDHAUSSEN, residing at Bredeney, Germany, all subjects of the Emperor of Germany, have invented a certain new and useful Improvement in Electrically-Driven Elevating Mechanism for Guns, of which the following is a specification.

The subject of this invention is an electrically operated elevating mechanism for guns, which provides for a particularly accurate adjustment of the gun barrel.

In the drawings one embodiment of the invention is shown by way of illustration.

Figure 1 shows a side elevation, partly in section, of the parts of a gun which are concerned with the present invention, together with the electrical equipment thereof. Figs. 2 and 3 are corresponding views, which serve for illustration of the mode of operation of the subject matter of the invention.

The gun barrel A is slidingly mounted in the cradle B. The latter rests upon the carriage body C (Fig. 1) through the medium of horizontal trunnions, of which one only ($b^1$) is shown in the drawing. Mounted to swing upon the trunnion $b^1$ is an index pointer D. This index pointer, together with an arm $d^1$, may be swung about the axis of the horizontal trunnions, by means of a hand-wheel E acting through the medium of a worm $e^1$ (Fig. 1) and a worm-wheel standing in engagement therewith. Upon the carriage body C is mounted a graduated arc $c^1$, over the graduations of which both the pointer D and a pointer $b^2$, rigidly connected with the cradle B, can play. When the pointers D and $b^2$ point to one and the same graduation mark of the arc $c^1$, the gun barrel stands at an angle of elevation or depression corresponding to the adjustment of the pointer D. Rigidly connected with the trunnion $b^1$ is a carrier $b^3$. Upon this carrier, two insulated contact rails $b^4$, $b^5$ are mounted. These contact rails lie concentric with the horizontal trunnions. The lower portion of the carrier $b^3$ is provided with teeth $b^6$, with which a toothed wheel F stands in engagement. This toothed wheel can be driven by an electrical motor G, acting through the medium of worm gear. (For purpose of perspicuity, the motor G is repeated in the circuit chart). With the parts in the position shown in Fig. 1, a triangular insulated contact piece $d^2$ occupies, with slight play, the space between the contact rails $b^4$, $b^5$, which contact piece is arranged upon the arm $d^1$ and can swing about the axis $d^3$. Abutting against this contact piece and slidingly mounted in an insulating box, under spring pressure, is the shaft of a likewise insulated contact piece $d^4$. Beneath the contact piece $d^4$ and upon the arm $d^1$ are two insulated contact pieces $d^5$, $d^6$. Arranged above the space between the contact rails $b^4$, $b^5$, and upon the carrier $b^3$, is an electrical spark blower $b^7$.

Erected on the base of the gun barrel, is an electro-magnetic firing device J, provided with a pot-magnet. The winding of this magnet is indicated by $i^1$. To the arrangement are also adapted two electro-magnetic relays. One is a double relay and consists of the windings K, M, and the armatures N, P. Connected with each of these armatures is a cross-bar, upon which are insulated contact pieces $n^1$, $n^2$, $n^3$, or $p^1$, $p^2$, $p^3$. If the armatures N, P, are drawn from their position of rest (Fig. 1), in which they are held by a spring arranged between their cross-bars, into the windings K, M, the contacts $n^1$ $n^2$ are caused to bear upon the fixed contacts $n^4$ $n^5$, and the contacts $p^1$ $p^2$ upon the fixed contacts $p^4$ $p^5$, while in the position of rest of armatures N, P, the contacts $n^3$ and $p^3$ touch. The second relay consists of the winding Q and the armature R. This carries an electrically conductive cross-bar $r^1$, which can contact with two fixed contact pieces $r^2$ $r^3$.

The several parts are connected by conductors with a source of electricity S+ S− and with one another in the following manner: Branching off from the conductor 1, which is connected with the pole S+ of the source of electricity, conductors 2, 3, 4, and 5 lead to the winding $i^1$ of magnet J, the contact piece $d^5$, the triangular contact piece $d^2$, and the spark blower $b^7$, respectively. The last-named is connected by a conductor 6 with the pole S− of the source of electricity. Also connected with the pole S− are the conductors 7 and 10. Branches 8 and 9 of the conductor 7 lead to a resistance U, and to the contact piece $r^3$ of the relay armature R, and branches 11, 12, 13 and 14 of the conductor 10 lead each to one end of the relay windings Q, K, M and to the contact piece $n^3$ of the relay armature N. The other ends of the relay windings Q, K, M, are connected by conductors 15, 16 and 17 with the contact $d^6$ of the arm $d^1$, and with the contact rails $b^4$ $b^5$. The contact pieces $r^2$, $n^4$ and $p^4$ are connected with one another by the conductors 18, 19 and 20; in the conductor 18 is included the resistance U. Leading from the winding $i^1$ of the magnet J to the contact $p^3$ of the relay armature P is a conductor 21, in which is included a switch T. The pole S+ of the source of current stands in connection through conductors 22, 23, with the contacts $n^5$ $p^5$. The motor armature G is included directly between the contact pieces $n^2$ $p^2$, which are connected crosswise with the contact pieces $n^1$ $p^1$. The field winding $q^1$ of the electric motor is connected in shunt directly with the poles of the electrical source S+ S−.

As soon as the pointer D has been adjusted through the medium of the hand-wheel E from the position of rest shown in Fig. 1, which corresponds to the horizontal or loading position of the gun barrel, to a slight elevation of about 2° (Fig. 2), the following conditions take place. Contact piece $d^2$ mounted on the arm $d^1$ which follows the movement of the pointer D comes into contact with the contact rail $b^5$. The contact piece $d^2$ then rotates about its axis $d^3$; this causes the contact piece $d^4$ to be moved downward, but not so far as to cause it to impinge the contacts $d^5$ $d^6$. By the contact of contact piece $d^2$ with the contact rail $b^5$, a circuit will be closed as follows, S+—1—4—$d^2$—$b^5$—17—M—13—10—7—S−. The relay winding M will thus be excited so that its armature will be attracted. This armature thereby closes a second circuit, S+—22—23—$p^5$—$p^2$—G—$n^2$—$p^1$—$p^4$—20—19—U—8—7—S−, which throws the motor armature G in circuit with the source of electricity. Since the field winding $q^1$ is permanently connected with the electrical source S+ S−, the motor will now begin to turn, and acting through the medium of the toothed-wheel F and the segment $b^6$, will swing the carrier $b^3$ with the cradle B and the gun barrel A in the direction of the arrow $x$ (Fig. 2). The movement of the motor at this time proceeds with moderate speed, since the resistance U is included in the circuit of the motor armature. As soon as the contact piece $d^2$ springs into the intermediate space between the contact rails $b^4$ $b^5$, the current passing through the relay winding M will be interrupted. The occurrence of arcing between the contact piece $d^2$ and the rail $b^5$ will be prevented by means of the spark blower $b^7$ which is connected with the source of supply through the medium of conductors 1, 5 and 6.

The winding M releases the armature P as soon as the current supplied to it is interrupted, and said armature will return to its position of rest under the influence of its before-mentioned spring. By this means, the motor armature is cut off from the source of current, but simultaneously the contacts $n^3$ and $p^3$ touch and establish a circuit S+—1—2—$i^1$—21—T—21—$p^3$—$n^3$—14—10—7—S−. As soon now as the switch T is closed, the gun will be fired.

Should the elevation to be imparted to the gun barrel be greater than that selected for illustration in the foregoing description, that is to say greater than about 2°, the contact piece $d^2$ during the adjustment of the pointer D, is turned by the contact rail $b^5$, until the contact piece $d^4$ is forced into contact with the contact pieces $d^5$ $d^6$ (Fig. 3). This establishes the following circuit, S+—1—3—$d^5$—$d^4$—$d^6$—15—Q—11—10—7—S−. The relay armature R will be attracted and its cross-bar $r^1$ will bridge the contacts $r^2$ and $r^3$; the resistance U will be short circuited from the armature circuit of the motor, so that the current flowing through the motor armature takes the path indicated by S+—22—$p^5$—$p^2$—G—$n^2$—$p^1$—$p^4$—20—19—18—$r^2$—$r^1$—$r^3$—9—8—7—S−. Inasmuch as the cutting out of the resistance U increases the strength of the armature circuit, the revolution of the motor will, of course, increase. The gun barrel will now be moved more rapidly. This rapid movement continues until the contact piece $d^4$ separates from the contacts $d^5$ $d^6$ and the circuit of the relay winding Q is thereby broken. The contact piece $d^4$ leaves the contacts $d^5$ $d^6$ a short time before the moment at which the contact piece $d^2$ springs into the space between the contact rails $b^4$ $b^5$. The cross-bar $r^1$ of the armature R, after the interruption of the circuit of the winding Q, releases the connection between the contacts $r^2$ $r^3$, so that the resistance U is again introduced into the motor armature circuit and the slow running of the motor is reëstablished. The gun barrel will thus be turned during the latter part of its movement with moderate speed.

If it is necessary to depress the gun barrel, the pointer D is swung upward from the intermediate position illustrated in Fig. 1. If it is to receive a depression of about 2°, the adjustment of the pointer D first causes the contact of the contact piece $d^2$ with the rail $b^4$ and the establishment of the circuit S+—1—4—$d^2$—$b^4$—16—K—12—10—7—S−; the relay armature will be attracted and close the circuit S+—22—$n^5$—$n^2$—G—$p^2$—$n^1$—$n^4$—19—U—8—7—S−; the electric motor runs with moderate speed and moves the barrel through the medium of the carrier $b^3$, so that the breech of the gun barrel is raised. If the adjustment necessitates a depression greater than about 2°, impingement takes place between the contact piece $d^4$ and the contact pieces $d^5$ $d^6$, the resistance U is short circuited by the attraction of the relay cross-bar $r^1$, and the motor runs more rapidly. Immediately before the springing of the contact piece $d^2$ into the space between the contact rails $b^4$ $b^5$, the resistance is again cut in and the slow travel of the motor reëstablished. After the springing in of the contact piece $d^2$ into the space between the rails $b^4$ $b^5$, the current of the circuit including the relay winding K will be interrupted; the armature N springs to its position of rest, interrupts the current flowing through the motor armature, and simultaneously establishes the firing circuit by the touching of the contact pieces $n^3$ $p^3$.

Having thus described our invention, the following is what we claim as new therein and desire to secure by Letters Patent:

1. In an electrically driven elevating mechanism for guns, mechanism for elevating and depressing the gun; a motor for driving said mechanism; a resistance normally in circuit with the electric motor when the gun is approaching the firing position whereby the speed of the motor is reduced; and means for automatically short-circuiting said resistance to cause the gun to travel faster during other portions of its travel.

2. In an electrically driven elevating mechanism for guns, the combination of the electric motor by which the gun is swung upon its trunnions; and controlling means comprising a resistance normally in circuit with said motor and an automatically operated armature for short-circuiting said resistance to cause the motor to travel more slowly as the gun-barrel approaches the limits of its movement.

3. In an electrically driven elevating mechanism for guns, the combination of the electric motor, suitably connected to the gun barrel for moving the latter upon its horizontal trunnions, suitable circuiting for supplying current to said motor, a resistance, contacts connected in parallel with said resistance, and a relay closing the motor circuit through the resistance when the gun barrel approaches the limits of its movement and cutting out the resistance and closing said circuit through the said contacts while the motor is moving the gun barrel between said limits.

4. In an electrically driven elevating mechanism for guns, the combination of the electric motor, by which the gun barrel is moved upon its horizontal trunnions, the circuit for said motor, the resistance in said circuit, the contacts introduced in said circuit in parallel with said resistance, the relay cutting out said resistance during intermediate portions of the movement of the gun barrel, but throwing said resistance into circuit as the gun barrel approaches the limits of its movement, a movable pointer, by which the angle to be imparted to the gun barrel is indicated, a contact piece partaking of the movement of said pointer, and electrical connections through which said contact piece controls the supply of current to the relay.

5. In an electrically driven elevating mechanism for guns, the combination with the elevating mechanism; of an electric motor for driving said mechanism; a pointer for indicating the angle of depression or elevation; and means carried by said pointer for automatically controlling the speed of the motor by the movement of the gun.

6. In an electrically driven elevating mechanism for guns, the combination with the elevating mechanism and the electric motor for driving the same; of a pointing attachment adapted to be set to indicate the desired elevation or depression of the gun; and means carried by the pointing attachment for automatically reducing the speed of the motor as the gun barrel approaches the limits of its movement.

7. In an electrically driven elevating mechanism for guns, the combination with the elevating mechanism and the motor for driving the same; of a pointing mechanism for predetermining the angle of elevation or depression of the gun, said mechanism being provided with means for automatically starting and stopping the motor and of reducing the speed of said motor as the gun barrel approaches the limits of its movement.

8. In an electrically driven elevating mechanism for guns, the combination with the elevating mechanism and the motor for driving the same; of a resistance in circuit with the armature of said motor during part of the time the gun is being elevated or depressed; a pointing device adapted to be set to any angle at which it is desired to fire the gun, said device being provided with means for completing a circuit through the motor and resistance in series and also with means for completing a circuiting through the motor without the resistance; and means connecting said pointing device with the gun-barrel whereby the speed of the motor is automatically controlled by the movement of the gun barrel.

9. In an electrically driven elevating mechanism for guns, the combination of the electric motor having a shunt circuit for its field winding and having its armature suitably connected for transferring the gun between loading and firing positions; a relay; a resistance; a pointer provided with means for automatically energizing said relay when said pointer is set at the angle at which the gun is to be fired; a second relay; means carried by the pointer whereby said second relay may be energized; and means moving with the gun barrel and provided with contacts whereby said relays are caused to be energized successively, said first-named relay being adapted to throw said resistance into and out of circuit with the armature of said motor.

The foregoing specification signed at Dusseldorf, Germany, this fourteenth day of March, 1908.

JOHANNES KRONE.
GUSTAV A. SCHOELLER.
HERMANN SUNDHAUSSEN.

In presence of—
PETER LIEBER,
WILHELM FLASCHE.